United States Patent
Bailey et al.

(10) Patent No.: US 8,444,729 B2
(45) Date of Patent: May 21, 2013

(54) ELECTRICALLY REGENERATED EXHAUST PARTICULATE FILTER HAVING NON-AXIAL REGENERATION FLAME PROPAGATION

(75) Inventors: Brett M. Bailey, Peoria, IL (US); Clifford E. Cotton, Bradford, IL (US); Christopher J. Rynders, Jr., Peoria Heights, IL (US); Michael J. Readey, Boulder, CO (US); Michael J. Pollard, Peoria, IL (US); Robert L. Meyer, Metamora, IL (US)

(73) Assignee: Caterpillar Inc., Peoria, IL (US)

( * ) Notice: Subject to any disclaimer, the term of this patent is extended or adjusted under 35 U.S.C. 154(b) by 685 days.

(21) Appl. No.: 12/503,136

(22) Filed: Jul. 15, 2009

(65) Prior Publication Data

US 2009/0272263 A1 Nov. 5, 2009

Related U.S. Application Data

(63) Continuation-in-part of application No. 11/986,716, filed on Nov. 26, 2007, now Pat. No. 7,981,174.

(51) Int. Cl.
| | |
|---|---|
| *B01D 50/00* | (2006.01) |
| *B01D 39/14* | (2006.01) |
| *B01D 39/06* | (2006.01) |
| *B01D 24/00* | (2006.01) |
| *B01D 46/00* | (2006.01) |

(52) U.S. Cl.
USPC .............. 55/282.3; 55/522; 55/523; 55/524; 55/312; 55/313; 55/314; 422/169; 422/170; 422/171; 422/172; 422/177; 422/178; 422/179; 422/180; 422/181; 422/182

(58) Field of Classification Search
USPC ............... 55/522–524, 282.3, 312–314; 422/169–172, 177–182
See application file for complete search history.

(56) References Cited

U.S. PATENT DOCUMENTS

| | | | |
|---|---|---|---|
| 3,853,510 A | | 12/1974 | Meyer et al. |
| 4,154,587 A | | 5/1979 | Gerok |
| 4,248,297 A | | 2/1981 | Pei |
| 4,359,864 A | | 11/1982 | Bailey |
| 4,415,344 A | | 11/1983 | Frost et al. |
| 4,418,662 A | | 12/1983 | Engler et al. |
| 4,456,457 A | * | 6/1984 | Nozawa et al. ............... 55/283 |
| 4,478,618 A | * | 10/1984 | Bly et al. ..................... 55/314 |
| 4,488,966 A | | 12/1984 | Schaeffer |
| 4,573,317 A | * | 3/1986 | Ludecke ..................... 60/303 |

(Continued)

OTHER PUBLICATIONS

Mann+Hummel Group, Diesel Particulate Filter for Off-Road Applications, pp. 1-2, http://www.mann-hummel.com/company/index.html.

*Primary Examiner* — Amber Orlando

(57) ABSTRACT

An exhaust particulate filter for an engine system includes an array of filter cartridges positioned within a shell, each of the cartridges having an electrically powered heating element coupled therewith. Exhaust gases may be distributed among the cartridges according to a single distribution pattern, and the filter can be regenerated without diverting, dividing or bypassing exhaust gases from the filter. The filter cartridges may be cylindrical or wedge-shaped, or of a variety of other configurations. Regeneration may take place according to a non-axial regeneration propagation profile. Other aspects include feedback control and feedforward control of regeneration based on sensing an electrical resistance property of each of the electrically powered heating elements.

20 Claims, 9 Drawing Sheets

U.S. PATENT DOCUMENTS

| | | | |
|---|---|---|---|
| 4,651,524 A * | 3/1987 | Brighton | 60/274 |
| 4,792,344 A | 12/1988 | Belcher et al. | |
| 4,829,766 A * | 5/1989 | Henkel | 60/303 |
| 5,002,666 A * | 3/1991 | Matsumoto et al. | 210/321.61 |
| 5,138,836 A * | 8/1992 | Pfister | 60/311 |
| 5,250,094 A * | 10/1993 | Chung et al. | 55/523 |
| 5,258,164 A * | 11/1993 | Bloom et al. | 422/174 |
| 5,293,742 A * | 3/1994 | Gillingham et al. | 60/288 |
| 5,388,400 A * | 2/1995 | Hoppenstedt et al. | 60/274 |
| 5,409,669 A * | 4/1995 | Smith et al. | 422/174 |
| 5,578,277 A * | 11/1996 | White et al. | 422/180 |
| 5,656,048 A * | 8/1997 | Smith et al. | 55/282 |
| 5,682,740 A | 11/1997 | Kawamura | |
| 5,701,735 A * | 12/1997 | Kawaguchi | 60/274 |
| 5,820,833 A * | 10/1998 | Kawamura | 422/174 |
| 5,938,802 A * | 8/1999 | Saito et al. | 55/282.3 |
| 6,090,172 A * | 7/2000 | Dementhon et al. | 55/282.3 |
| 6,107,603 A | 8/2000 | Dementhon et al. | |
| 6,176,896 B1 * | 1/2001 | Dementhon et al. | 95/14 |
| 6,572,682 B2 * | 6/2003 | Peter et al. | 95/278 |
| 6,991,668 B2 | 1/2006 | Towsley | |
| 7,029,510 B2 | 4/2006 | Frankle et al. | |
| 7,044,992 B2 | 5/2006 | Frankle et al. | |
| 7,052,532 B1 | 5/2006 | Liu et al. | |
| 7,160,355 B2 | 1/2007 | Steiner | |
| 2004/0131511 A1 * | 7/2004 | Marrecau et al. | 422/174 |
| 2006/0070364 A1 * | 4/2006 | Reamsnyder et al. | 55/484 |
| 2006/0144900 A1 | 7/2006 | Hirth et al. | |
| 2007/0227104 A1 * | 10/2007 | Gonze et al. | 55/282.3 |

* cited by examiner

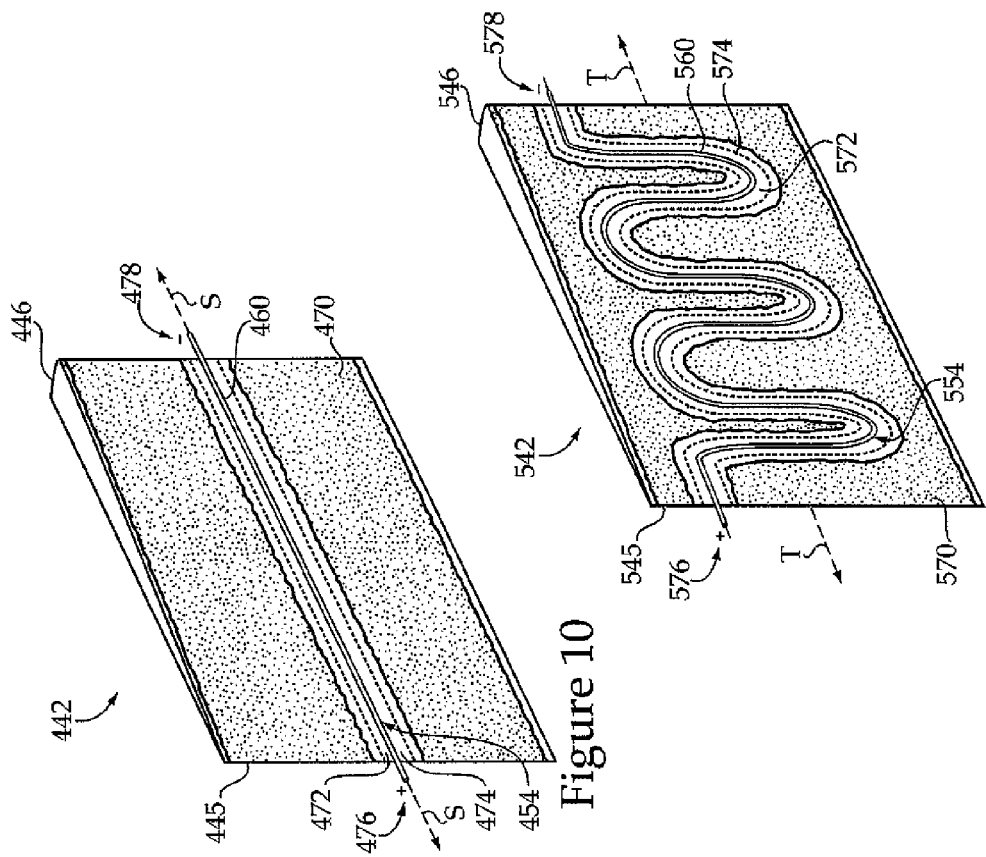
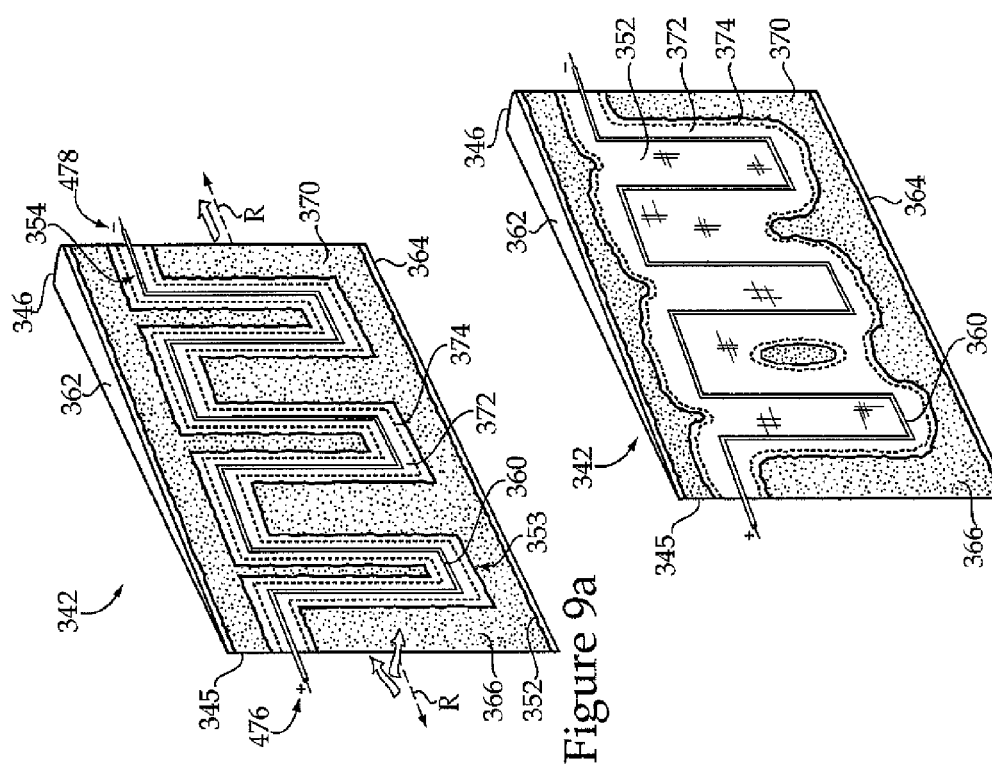

ELECTRICALLY REGENERATED EXHAUST PARTICULATE FILTER HAVING NON-AXIAL REGENERATION FLAME PROPAGATION

CROSS-REFERENCE TO RELATED APPLICATIONS

This application is a continuation-in-part of U.S. patent application Ser. No. 11/986,716, filed Nov. 26, 2007.

TECHNICAL FIELD

The present disclosure relates generally to electrically regenerated exhaust particulate filters used in engine systems and regeneration strategies therefor, and relates more particularly to propagating a regeneration flame about a fibrous metallic filter element of an electrically regenerated exhaust particulate filter according to a non-axial regeneration propagation profile.

BACKGROUND

Operation of internal combustion engines, particularly diesel engines, usually results in the generation of particulate matter (PM) including inorganic species (ash), sulfates, small organic species generally referred to as soluble organic fraction (SOF), and hydrocarbon particulates or "soot." Various strategies have been used over the years for preventing release of PM into the environment. For some time, on-highway machines have been equipped with exhaust particulate traps as standard equipment. More recently, off-highway machines have been the subject of attention with regard to reducing/controlling PM emissions. While various designs for on-highway exhaust particulate filters have proven to be relatively effective in their intended environment, there are certain shortcomings to the designs if subjected to the demands placed on many off-highway machines. Moreover, even the most successful of the many known on-highway systems suffer from various drawbacks.

Conventional exhaust particulate filters are available in a wide variety of designs. Commonly, a fibrous material or porous ceramic material is positioned in the path of exhaust exiting an engine, and collects particulates to prevent then escape via the engine exhaust stream. The accumulation of PM within a filter tends to increase the resistance of the filter apparatus to the flow of exhaust gas, necessitating some means of cleaning the filter material, as reduced flow can affect fuel consumption, altitude capability, engine response and exhaust inlet and outlet temperatures. While filters may be mechanically cleaned, they tend to clog frequently enough that manual or mechanized cleaning is impractical.

Common approaches for removing accumulated PM from exhaust filters have been to regenerate the filter with heat or with heat and catalysts. Since typical engine exhaust temperatures are only intermittently, if ever, high enough to initiate combustion of accumulated PM, some means for periodically generating extra heat energy and/or the provision of combustion-facilitating catalyst materials has typically been used. Intake throttling and exhaust throttling are also used to increase the temperature of exhaust gas to a temperature sufficient to initiate combustion of the accumulated PM. In any case, once combustion of the accumulated PM is induced, it can be consumed rather than passed out to the environment, and returning the filter to a desired state. These approaches, however, have their own disadvantages.

On the one hand, catalyst materials tend to be relatively expensive, having obvious disadvantages where a manufacturer seeks to commercialize a particular filter design. On the other hand, applying additional heat energy, with or without catalysts, typically requires some type of auxiliary burner or other relatively complicated subsystem. Many filter regeneration strategies have also suffered from the inability to reliably initiate or maintain acceptable combustion of the accumulated PM without temporarily blocking or reducing exhaust flow through the portion of the filter to be regenerated. In some instances, for example where the filter design relies upon propagation of a flame against the flow of exhaust gases, the exhaust gases can apparently blow out the flame. In other instances, where a flame is propagated with the flow of exhaust gases, rather than unsustainable combustion the PM can burn out of control, raising the temperature of the filter and related components above temperatures they are designed to withstand.

Engineers have relied in many instances on relatively complicated valving or bypass systems to control exhaust throughput to a portion of the filter being regenerated. This is done in an attempt to achieve self-sustaining combustion of accumulated PM without combustion getting out of control. The moving parts in such systems not only add complexity, weight and expense to the associated machine, they also can fail, particularly when subjected to the rigors of off-highway work.

A still further problem associated with conventional regeneration strategies is the excessive energy consumed in the regeneration process. In the case of auxiliary burner strategies, extra fuel is typically injected into and combusted in the exhaust gas stream to raise the temperature of the exhaust gases to a regeneration temperature. Various electrically regenerated systems have been proposed, however, they too tend to require an excess of energy to regenerate. Conventional alternators and batteries commonly used with diesel engine-powered machines are not typically sufficiently powerful to regenerate an exhaust particulate filter, and supplementary electrical power such as a connection to a power grid or an oversized alternator is commonly required.

U.S. Pat. No. 5,293,742 to Gillingham et al. ("Gillingham") is directed to a trap apparatus having tubular filter elements, for use in particular with diesel engines. In the design set forth in Gillingham, filter tubes surrounded with filter material such as yarn or various foams are used. The filter tubes are positioned within a housing, subdivided into different sectors. During regeneration, parts of the housing can be closed off and the filter tubes therein heated via electric heaters to effect regeneration. While the design of Gillingham may serve its intended purpose, it suffers from a variety of drawbacks. On the one hand, an elaborate system is necessary to direct exhaust gases to only certain parts of the filter apparatus, while restricting flow of exhaust gases to certain parts for regeneration. Restricting flow inherently reduces the efficacy of the filter and possibly the overall exhaust system, as regeneration is often necessary relatively frequently, often numerous times a day depending upon operating conditions. As is the case with many electrically regenerable filters, discussed above, Gillingham may also need a relatively large amount of electrical energy to successfully regenerate.

SUMMARY

In one aspect, a method of operating an exhaust particulate filter system for an internal combustion engine includes a step of feeding exhaust gases from an exhaust gas inlet of an exhaust particulate filter shell into a composite filtration unit positioned within the exhaust particulate filter shell, the composite filtration unit defining a longitudinal filter axis and having a plurality of filter elements which each include a fibrous metallic material having a particulate loading area. The method further includes a step of initiating regeneration of one of the filter elements via energizing an electrically powered heating element having a contact interface with the fibrous metallic material within the corresponding particulate loading area which defines a non-axial regeneration propagation profile. The method still further includes a step of propagating a regeneration flame about the one of the filter elements according to the non-axial regeneration propagation profile.

In another aspect, a method of regenerating an exhaust particulate filter including a composite filtration unit having a longitudinal filter axis and a plurality of filter elements each having a fibrous metallic material includes a step of energizing at least one of a plurality of electrically powered heating elements associated one with each of the filter elements and having a contact interface with the corresponding fibrous metallic material within a particulate loading area thereof. The method further includes a step of regenerating at least one of the filter elements according to a non-axial regeneration propagation profile defined by the corresponding contact interface via the step of energizing at least one of the plurality of electrically powered heating elements.

In still another aspect, an exhaust particulate filter includes a composite filtration unit defining a longitudinal filter axis and including a frame and a plurality of filter elements coupled with the frame which are arranged about and radially spaced from the longitudinal filter axis, each of the filter elements having a first axial end, a second axial end and a fibrous metallic material extending between the first axial end and the second axial end, the fibrous metallic material including a particulate loading area. The exhaust particulate filter further includes a plurality of electrically powered heating elements each of which contact the fibrous metallic material of one of the filter elements via a contact interface within the particulate loading area. The contact interface defines a non-axial regeneration propagation profile for a corresponding one of the filter elements. Each of the filter elements is configured via energizing a corresponding one of the electrically powered heating elements for selective regeneration according to the non-axial regeneration propagation profile.

BRIEF DESCRIPTION OF THE DRAWINGS

FIG. 9a is a diagrammatic view of a filter element at a regeneration state, according to one embodiment;

FIG. 9b is a diagrammatic view of the filter element of FIG. 9a at another regeneration state;

FIG. 10 is a diagrammatic view of a filter element at a regeneration state, according to one embodiment;

FIG. 11 is a diagrammatic view of a filter element at a regeneration state, according to another embodiment.

DETAILED DESCRIPTION

Figure 1:
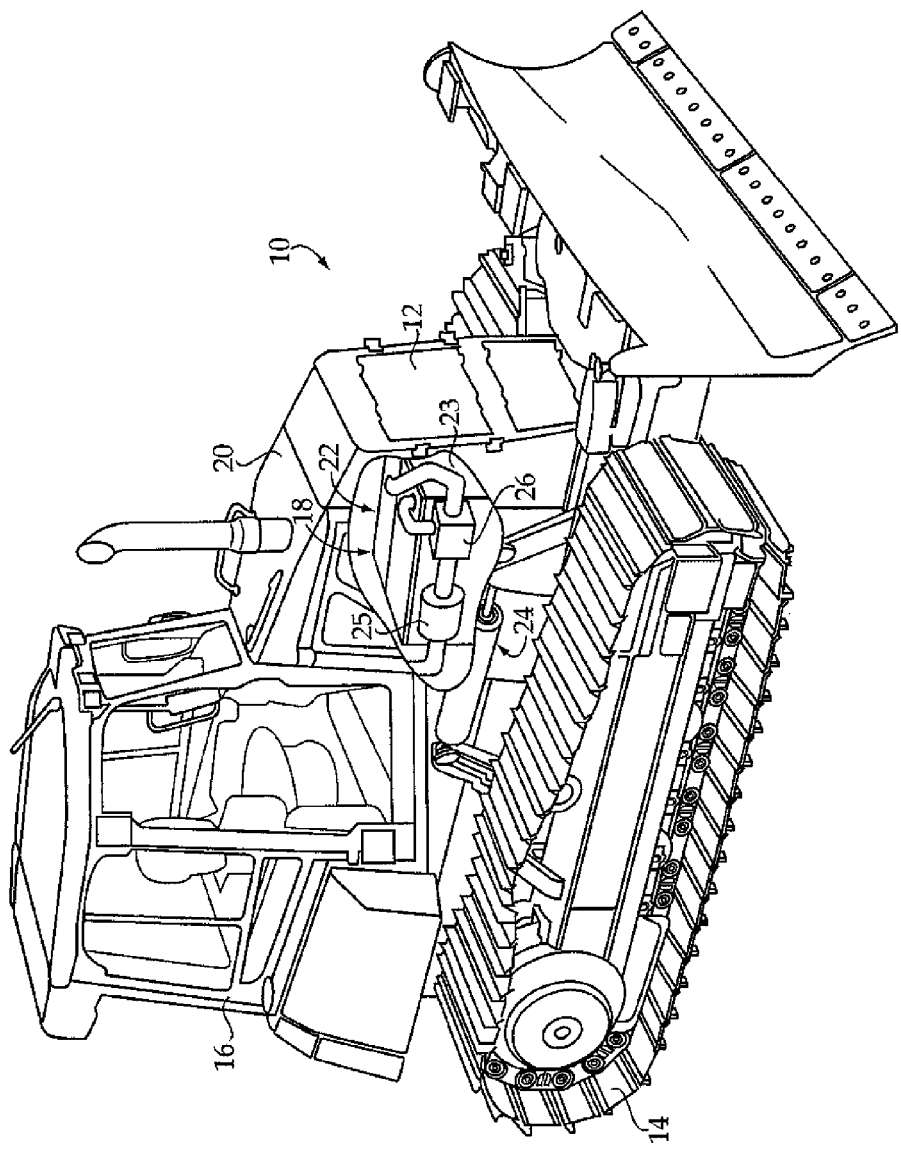
FIG. 1 is a perspective view of an off-highway machine, having an exhaust particulate filter system, according to one embodiment.

Referring to FIG. 1, there is shown a machine 10 according to one embodiment. Machine 10 is shown in the context of an off-highway track-type tractor having a frame 12, ground engaging tracks 14 mounted to frame 12 and an operator cab 16 also mounted to frame 12. Machine 10 may further include an engine system 22 having an engine 23 such as a compression ignition diesel engine, coupled with an exhaust particulate filter system 24 which includes an exhaust particulate filter 25. In one embodiment, filter 25 may have a shape such that filter 25 fits within a predefined spatial envelope, within an engine compartment 18 of machine 10. This space available for mounting filter 25 may be dictated by a variety of factors, including size and shape of various components of engine system 22 such as a turbocharger 26 coupled with an exhaust pipe 28, a hood 20, frame 12 and various other parts of machine 10 depending upon its particular design. Other concerns may also dictate the location, size and shape of the predefined spatial envelope for filter 25. For example, it may be desirable in some instances to locate filter 25 outside of engine compartment 18 for purposes such as thermal management of engine 23, or simply for matters of convenience. In addition to shape, location and mounting flexibility available with filter system 24, it may be regenerated by way of a unique strategy, providing further advantages over state of the art exhaust particulate filter systems. Whereas temperature concerns in many known strategies require positioning a filter in close proximity to its associated engine, or extensive thermal insulation, filter system 24 can be located essentially anywhere on machine 10. The foregoing and other features make filter system 24 amenable to fitting into relatively restrictive preexisting spatial envelopes, including retrofitting existing machines, as well as providing a spectrum of shape, mounting and location options to designers developing altogether new machine configurations.

While off-highway machines such as tracks, tractors, loaders, graders, scrapers, etc. may benefit from the use of exhaust particulate filter systems as described herein, the present disclosure is not limited in this regard. Machine 10 might be an on-highway machine, or even a stationary machine such as a generator or genset. Further still, while machines having spatial constraints for filter mounting are mentioned herein, the present disclosure is also not limited in this regard.

Figure 2:
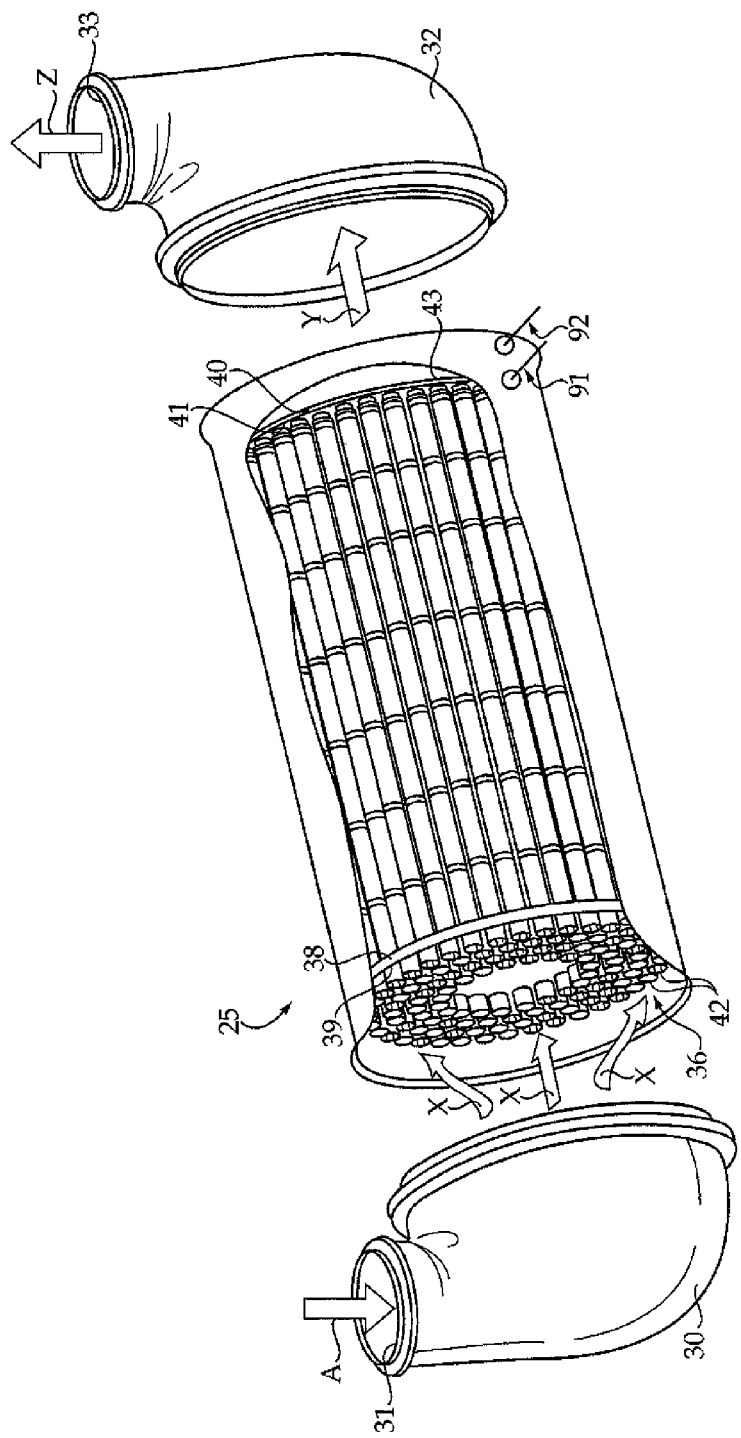
FIG. 2 is a partially open perspective view of a partially disassembled exhaust particulate filter, according to one embodiment.

Referring also to FIG. 2, there is shown a partially disassembled exhaust particulate filter 25, similar to that shown in FIG. 1. Filter 25 may include an inlet portion 30 having an exhaust gas inlet 31, an outlet portion 32 having an exhaust gas outlet 33 and a shell 34. Other fluid connections to filter 25 may exist for various purposes, such as exhaust gas recirculation, exhaust gas cooling and connecting with one or more turbochargers. Inlet portion 30, outlet portion 32 and shell 34 may together comprise a filter housing having a shape. In certain embodiments, the shapes of one or more of the respective housing components 30, 32 and 34 may be tailored to fit filter 25 within the aforementioned predefined spatial envelope. For example, filter 25 may have a generally circular axial cross-section such as that shown in FIG. 2, a generally oblong axial cross-section, a rectangular axial cross section, or some other shape. "Axial" cross-section should be understood as referring to a cross-section perpendicular a longitudinal central axis of shell 34 (not shown), extending between components 30 and 32.

Shape flexibility of filter 25, as well as other advantages, arise in part from the manner in which certain components of filter 25 are designed. Filter 25 may include a plurality of identical filter cartridges 42, for example, fifty or more cartridges, or even one hundred or more cartridges in some embodiments, which are positioned in an array 36. An example embodiment, such as a stationary power generation system might utilize a thousand or more cartridges. The use of numerous identical filter cartridges allows the general shape of filter 25 to be quite flexible as compared to many earlier filter designs, without sacrificing efficacy. It should be appreciated that certain embodiments might include differing shapes, sizes or lengths of cartridges, thus the present description should not be construed to suggest that every single cartridge be identical. Since each individual filter cartridge 42 comprises a relatively small proportion of array 36, changes to the overall shape of array 36 may be driven more by the machine application than the shape of the individual cartridges 42. This differs from many earlier systems wherein a relatively small number of filter elements are arranged in a pattern dictated or limited by the overall filter design or manner of construction rather than by a spatial envelope into which the filter is to be fit. Each of filter cartridges 42 in array 36 may filter exhaust gases passing from exhaust gas inlet 31 to exhaust gas outlet 33. Arrows illustrate an approximate exhaust gas flow path through filter 25, including a first segment A, a second segment X, a third segment Y and a fourth segment Z. Thus, exhaust gases may enter inlet 31 via segment A, and may then enter shell 34 via segment X, exit shell 34 via segment Y and exit outlet portion 32 via segment Z. Within shell 34, exhaust gases pass through cartridges 42 of array 36 whereby particulates are removed, as described herein.

Cartridges 42 may be supported in a first support frame or plate 38 and a second support frame or plate 40. Holes 39 and 41 in plates 38 and 40, respectively, may receive ends of cartridges 42 and may be arranged in a pattern corresponding to an arrangement and distribution of filter cartridges 42 in array 36. Where a non-cylindrical filter is used, the pattern of holes 39 and 41 may be varied to correspond to the overall shape of the filter. Each of support plates 38 and 40 may include an outer perimeter or edge 37 and 43, respectively, which is matched to a shape of shell 34. Support plates 38 and 40 may have circular shapes similar to that shown in FIG. 2, or they might have a wide variety of other shapes such as triangular, circular, square, trapezoidal or even irregular and non-polygonal shapes. Array 36 may have an essentially limitless variety of configurations corresponding to a shape of shell 34, and in turn support plates 38 and 40, imparting shape flexibility to filter 25 limited generally only to manufacturing capabilities and/or practicalities for the various components.

In one embodiment, first support plate 38 comprises a distribution element for exhaust gases which is adapted to direct exhaust gases toward inlets of each of cartridges 42 according to a single exhaust gas distribution pattern of filter 25. As used herein, "single exhaust gas distribution pattern" means that flow dividers, restrictions, valves, diverters, bypass lines, or other means for changing the distribution of exhaust gases to inlets of cartridges 42 are not used in filter 25. Thus, plate 38, or such other exhaust gas distribution elements as may be used with filter 25, has a fixed configuration, and the distribution of exhaust gases is not adjustable in filter 25. On this and other bases, filter 25 differs from exhaust particulate filters, such as Gillingham et al., described above, which vary distribution of exhaust gases among elements of the filter for various purposes. This feature of filters and operating strategies according to the present disclosure has many advantages, including reduced cost, complexity and improved reliability, as a filter having few or no moving parts is made possible.

Moreover, since no portion of filter 25 is blocked from exhaust flow, even for regeneration, the size of filter 25 and total number of its cartridges may be tailored more closely to expected filtering needs rather than oversized to compensate for a portion of the cartridges which are blocked off for regeneration. Various particulate filters are known which utilize diffusers to reduce exhaust gas flow velocity to a level appropriate for desired filter efficacy and to facilitate uniform loading of the filter during operation. Filters contemplated herein might include an inlet and/or an outlet diffuser, and in some instances may include relatively simpler inlet and/or outlet diffusers than are known from earlier filters, as filter 25 is considered to be relatively less sensitive to unevenness in flow for reasons which will be apparent from the following description. Also shown in FIG. 2 are electrical connectors 91 and 92 mounted to shell 34 which are part of a regeneration system for filter 25 described herein, and are configured to connect with an electrical power source of machine 10. It is contemplated that the electrical power source used in regenerating filter 25 may be a conventional on-board power source, such as an alternator, a battery, or a generator. Alternatives are contemplated, however, as further described herein. The power draw from an electrical power source required in regenerating filter 25 may be substantially less than in other electrically regenerated filters, enabling the use of conventional-sized alternators, batteries, etc.

Figure 3:
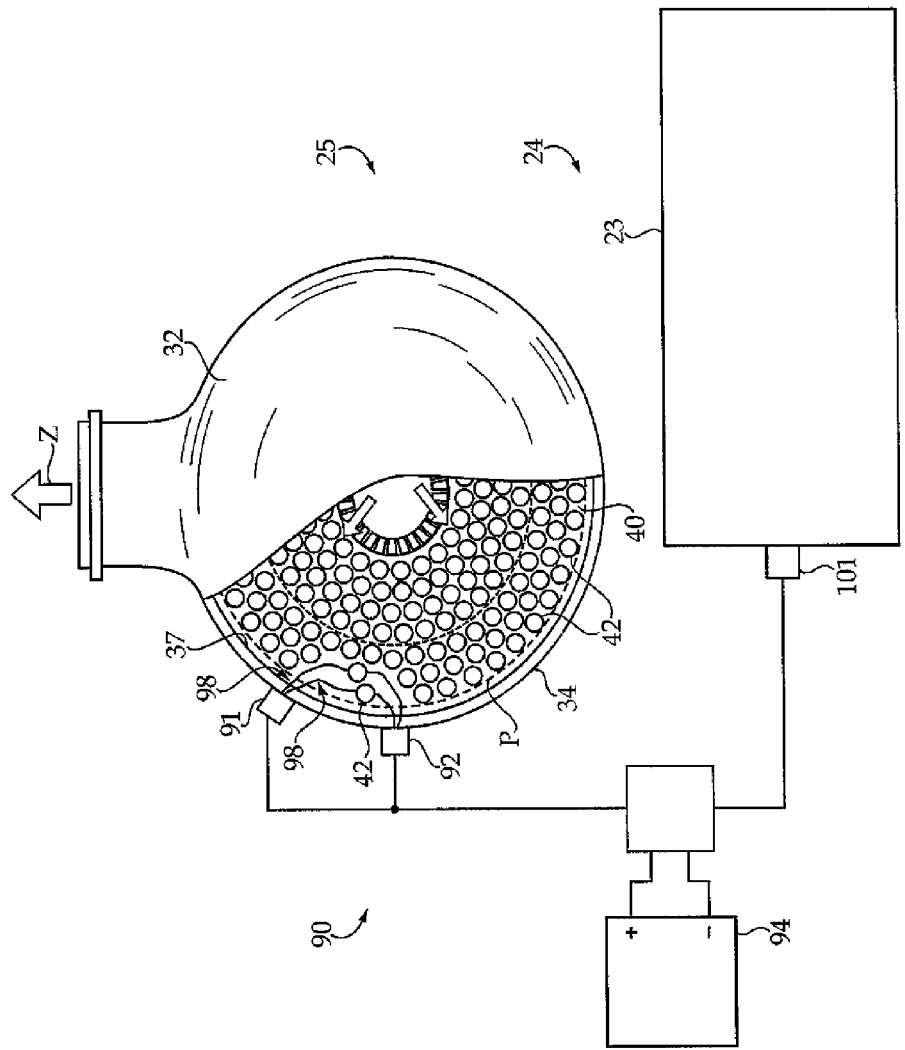
FIG. 3 is a partially open diagrammatic end view of an exhaust particulate filter system, according to one embodiment.

Referring to FIG. 3, there is shown an end view of fitter 25, partially open to illustrate filter cartridges 42 supported in plate 40. Plate 40 includes an outlet 49 through which exhaust gases may pass, after being filtered via cartridges 42. In one embodiment, filter cartridges 42 may be packed within shell 34 according to a packing arrangement, such as a hexagonal packing arrangement, and each individual cartridge 42 separated from adjacent cartridges by an average distance less than a width of one of cartridges 42. Shell 34 may further include an inner perimeter 37 which is spaced from a perimetric line P which is tangent to peripherally located ones of filter cartridges 42. Packing filter cartridges 42 into shell 34 can avoid wasted space and thus reduce filter size, as a relatively great number of filter cartridges 42 can be packed into a given volume defined by shell 34. The relatively small diameter of each of filter cartridges 42 allows a relatively larger number to be used in filter 25 than what would be possible with fewer cartridges. Also shown in FIG. 3 is a regeneration system 90 coupled with filter 25 and with engine 23. Regeneration system 90 may be configured to connect with or may itself include an electrical power source 94. In one embodiment, electrical power source 94 comprises a battery, whereas in other embodiments electrical power source 94 might be an alternator coupled with engine 23, a stand-alone generator, an electrical grid, etc.

Electrical power source 94 might also comprise thermoelectric generators coupled with one or more of cartridges 42 or positioned elsewhere within filter 25. Certain commercially available thermoelectric generators are capable of operating in two modes, the first of which generates heat when electrical power is supplied thereto, and the second of which generates electrical power when heat is supplied. In one embodiment, thermoelectric generators associated with one or more of cartridges 42 could be operating in the first mode, and others operating in the second mode. Those thermoelectric generators which are operating in the second mode could generate electrical power used by the thermoelectric generators operating in the first mode, generating heat to initiate regeneration of an associated filter cartridge.

Whatever the electrical power source used, regeneration system 90 may be operable to regenerate one or more of cartridges 42, and may include an electronic control unit 96 which is configured to select one or more, but typically less than all of cartridges 42 for regeneration at any given time. Electronic control unit 96, which may be an engine controller for engine 23 or a separate controller, may be configured via executing computer readable code to selectively regenerate one or more of cartridges 42 on an as-needed basis or at predetermined intervals or in a predetermined pattern, further described herein. In one embodiment, electronic control unit 96 may comprise a control device coupled with electrical power source 94 and configured to selectively supply electrical power to electrically powered heating elements, for example resistive heating elements such as resistive wires, or other electrically powered heating elements such as thermoelectric generators, associated one with each of cartridges 42. Electrical circuits 98 may connect between connectors 91 and 92, each being selectively energized via electronic control unit 96 as described herein and having the electrically powered heating element associated with the corresponding cartridge 42 located therein. It should be appreciated that in certain embodiments some of cartridges 42, or such other cartridges as might be used in the present context, may be passively regenerated.

Electronic control unit 96 may also comprise a monitoring device configured to monitor an electrical resistance property in each of electrical circuits 98 and generate a signal corresponding to the monitored electrical resistance property, as further described herein. Regeneration of selected ones of cartridges 42 may be initiated in a manner responsive to the signal associated with the monitored electrical resistance property of the corresponding circuit. A variety of types of wiring harnesses and the like might be used to couple connectors 91 and 92 with circuits 98. Other strategies, such as a single circuit board having connectors corresponding to each of electrical circuits 98, and arranged in a predetermined pattern such that circuits 98 may be readily connected therewith upon assembling filter 25, might also be used. Filter system 24 may further include a sensor 101 such as a speed or load sensor coupled with engine 23 and outputting a signal indicative of an exhaust mass flow from engine 23. In certain embodiments, described hereinbelow, electronic control unit 96 may initiate regeneration of selected ones of cartridges 42 in a manner which is responsive to signals from sensor 101.

Figure 4:
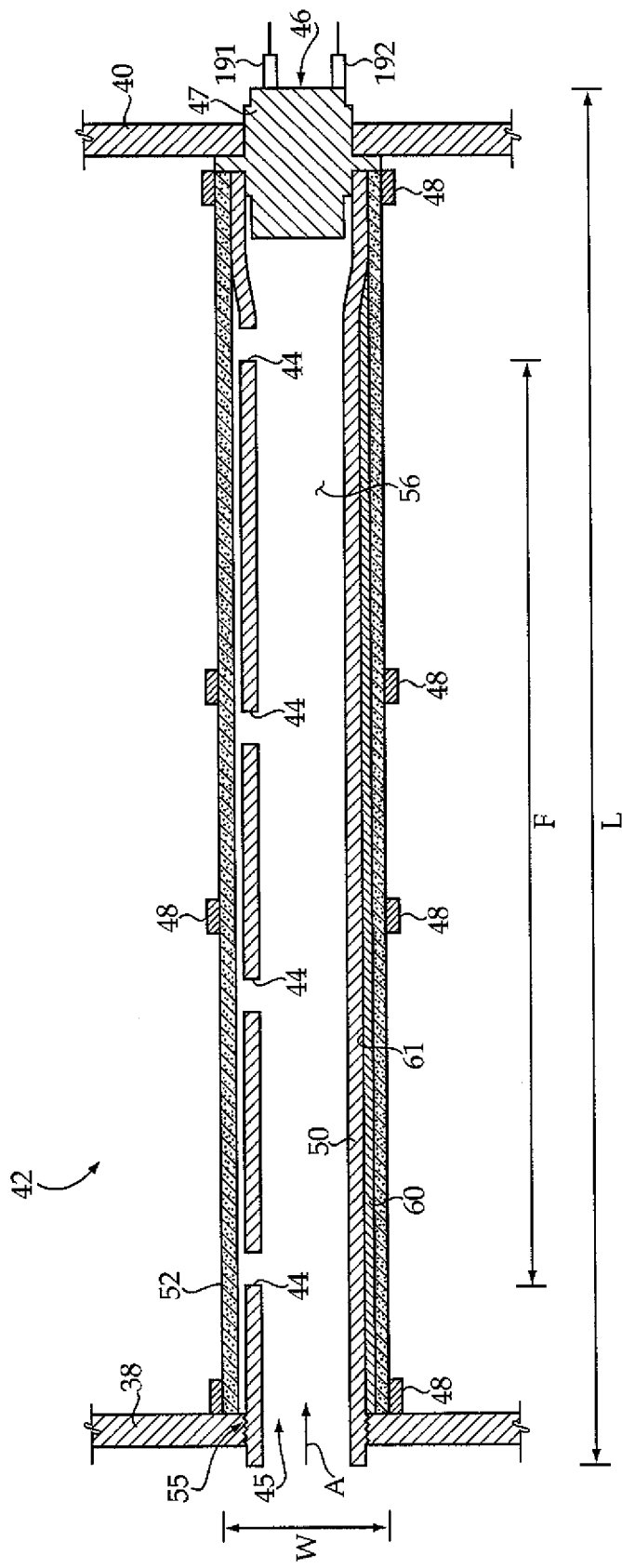
FIG. 4 is a sectioned side view of a cartridge for an exhaust particulate filter, according to one embodiment.

Turning now to FIG. 4, there is shown a sectioned side view of a cartridge 42 according to one embodiment. Cartridge 42 includes a tube 50 having a plurality of perforations 44 therein which provide fluid communications between an interior 56 of tube 50 and an exterior thereof, which will typically be an interior of filter 25. Although using hollow cylinders for each of tubes 50 may be one practical implementation strategy, the term "tube" should not be understood as limited to cylindrical shapes, and square, triangular or another shape might be used without departing from the scope of the present disclosure. Tube 50 is wrapped with one or more layers of a fibrous metallic filter medium 52. In one embodiment, filter medium 52 consists of a sintered mat of metal fibers. Other filter media are contemplated herein, however, such as metallic yarns or wools, etc., which may be placed within interior 56 or wrapped about tube 50. Tube 50 includes a first end 45, comprising an open end, and a second, opposite end 46 which comprises a closed end. Exhaust gases may pass into end 45, illustrated via arrow A, into interior 56, and then out through filter medium 52 via perforations 44. Particulate matter in the stream of exhaust gases is thus filtered via filter medium 52. While the illustrated flow pattern, i.e. out of interior 56 via perforations 44, is one practical implementation strategy, the present disclosure is not thereby limited and exhaust gases could be passed into ulterior 56 via perforations 44, then out of cartridge 42 via first end 45. In the case of either strategy, filter medium 52 might be placed either inside tube 50 or outside of tube 50. A plurality of clamps 48 may be provided and positioned about tube 50 to clamp filter medium 52 in place. In one embodiment, clamps 48 may be secured about tube 50 and filter medium 52 by a technique known in the art as swagging, more fully described in commonly owned and U.S. patent application Ser. No. 11/728,905, now abandoned.

Tube 50 may further include a mounting element 55 proximate first end 45 which comprises a fastening element 55 configured to immovably mount tube 50 to plate 38. As used herein, the term "immovably" should be understood to mean that tube 50 occupies a fixed location relative to plate 38 when assembled therewith. Mounting element 55 might comprise threads such that tube 50 is screwed into plate 38, element 55 might also comprise a radially expanded portion of tube 50, such as may be achieved via swagging. Still other coupling strategies might be used to immovably couple end 45 to plate 38 or another support structure, such as various clamping arrangements, welding or brazing, etc. In contrast, end 46 may be movably coupled with plate 40. A stepped or tapered ping 47 or other support element may comprise a mounting element positioned at end 46 which is loose fitted into plate 40.

In one embodiment, tube 50 and possibly support plates 38 and 40 may be formed from 439 stainless steel, whereas filter media 52 may include an iron, chromium and aluminum alloy. All or substantially all of the components of filters according to the present disclosure may consist of one form or another of ferritic stainless steel in certain embodiments. By loose-fitting plug 47 in support plate 40, a feature which may be common to all of the filter designs contemplated herein, cartridge 42 may move relative to support plate 40 due to expansion and contraction resulting from thermal cycling.

Returning to FIG. 3, as mentioned above cartridges 42 may have a hexagonal packing arrangement, generally permitting a maximum number of filter cartridges to be located within a given volume based on the available spatial envelope in or on machine 10, for example. Where a hexagonal packing arrangement is used, a majority of internally located filter cartridges 42 in array 36 will typically be surrounded by at least five other filter cartridges, whereas a majority of peripherally located filter cartridges 42 will typically be surrounded by fewer than five other filter cartridges. Internally located filter cartridges 42 will generally be greater in number than peripherally located filter cartridges 42. In accordance with the packing arrangement, cartridges 42 may be positioned at an average distance from one another that is less than an average diameter of cartridges 42. This average distance may also be an equal distance between all of the respective filter cartridges. In certain embodiments, cartridges 42 may be positioned at an average distance from one another that is less than one half an average diameter of cartridges 42. It may be desirable to pack cartridges 42 within shell 34 as tightly as practicable to maximize the amount of surface area available for filtering exhaust gases. In one embodiment, cartridges 42 may have their respective clamps 48 located at similar positions relative to the lengths of cartridges 42, clamps 48 being spaced from one another by about 1.5 millimeters. It should be appreciated that the number of cartridges surrounding any one cartridge, the proportion of internally located cartridges relative to peripherally located cartridges, and other factors, may vary based on the specific filter shape, packing arrangement, filter size, cartridge diameter, etc.

In one embodiment, each cartridge 42 is arranged such that their first, open ends 45 are supported in support plate 38 and fluidly connected with an interior of inlet portion 30 for receiving raw exhaust gases, and their second end 46 supported in support plate 40. Thus, all of cartridges 42 may be oriented identically. Other embodiments are contemplated, however, wherein cartridges are arranged in filter 25 with their closed ends 46 toward inlet portion 30, or in both possible orientations such that exhaust gases pass into open ends of only a portion of cartridges 42, then into counter-oriented cartridges, and finally out to outlet portion 32 via open ends 45 fluidly connected therewith.

Returning to FIG. 4, perforations 44 will typically be spaced along a length L of cartridge 42, and may define a filtering length F of cartridge 42. In other words, the proportion of length L along which perforations 44 are spaced may be understood as an effective length of cartridge 42 which is available for filtering exhaust gases. In one embodiment, filtering length F may be equal at least to a majority of length L. Cartridge 42 may further include a width W, which may be at least an order of magnitude less than length L.

Cartridge 42 may also include an electrically powered heating element 60, which may be positioned between tube 50 and filter medium 52, such that it contacts filter medium 52 and particulate matter accumulated therein. Positioning heating element 60 in contact with filter medium 52 can allow it to transfer heat to accumulated particulate matter via conduction, convection and radiation. In one embodiment, element 60 may comprise a linear heating element such as an electrically resistive wire or the like, extending in a straight line and having a length equal at least to a majority of filtering length F. Known electrically resistive wires such as a coated nickel-chromium "nichrome" wire might be used in some embodiments, although in other embodiments other known electrically resistive wires might be used. Element 60 might also have a length which is equal to or greater than filtering length F. Cartridge 42 may further include a first electrical connector 191 and a second electrical connector 192, which are configured to connect with one of electrical circuits 98 for supplying electrical power to element 60, as described herein. Each cartridge 42 which is a part of filter 25 may include one heating element such as element 60.

Tube 50 may further include a weld seam 61 which is free of perforations 44, for example a weld seam formed during manufacturing of tube 50. In one embodiment, heating element 60 may extend along weld seam 61, reducing the extent to which exhaust flows directly past or over heating element 60 or at least increasing the path exhaust must follow through filter medium 52 to reach element 60. This arrangement can facilitate ignition of particulate matter in the vicinity thereof for regeneration due to reduced exhaust flow velocity in the region of a soot cake adjacent element 60 where regeneration is to be initiated. Moreover, initiation of combustion, i.e. regeneration, may be relatively easy with the described arrangement, given the relatively long contact length between element 60 and medium 52 in at least some embodiments. Sustaining a controlled flame in an ignited soot cake in filters according to the present disclosure may also be relatively easy, as flame propagation may take place longitudinally, as opposed to axially. Stated another way, propagation of a regeneration flame may take place about a circumference of a filter cartridge, such as a circumference of tube 50. Axial propagation against a flow of exhaust gas may be difficult to sustain, whereas axial propagation with a flow of exhaust gas may be more difficult to control, although systems using axial propagation could still fall within the scope of the present disclosure.

Figure 5:
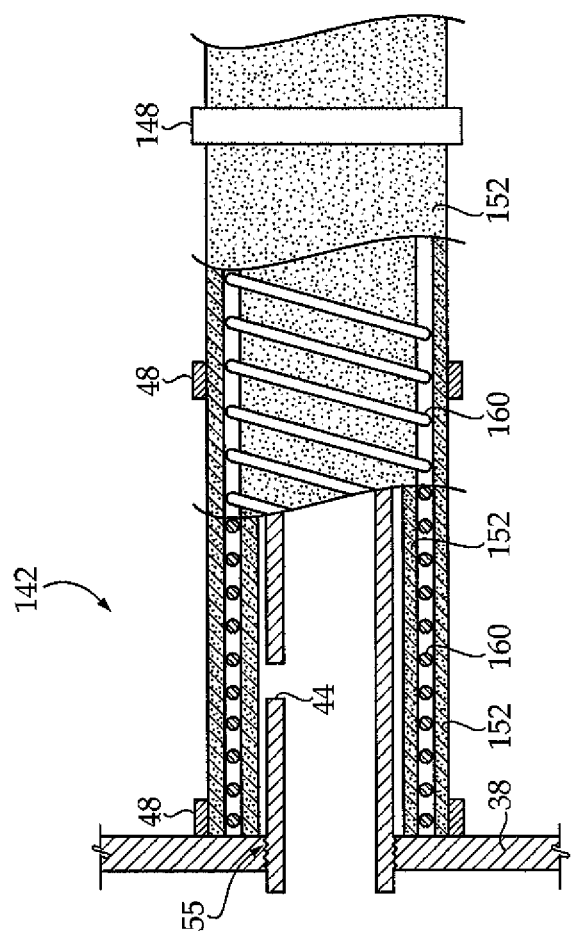
FIG. 5 is a partially sectioned side view, in two section planes, of a portion of a filter cartridge for an exhaust particulate filter, according to one embodiment.

Referring now to FIG. 5, there is shown a filter cartridge 142 wherein features alike to those already described herein are identified with identical reference numerals. Cartridge 142 is similar to cartridge 42, but has several differences, among them the use of a different heating element 160 for initiating regeneration. Rather than a linear heating element positioned generally in a straight line extending along tube 50, cartridge 142 has a heating element which is wrapped within layers of a filter medium 152 and generally spirals about tube 50. Clamps 48 clamp the heating element 160 in position, sandwiched between layers of filter medium 152. Cartridge 142 may be immovably coupled with plate 38 similar to the embodiments described above, and may also be configured to connect with an electrical circuit similar to the arrangement described with regard to cartridge 42 in FIG. 4. Since cartridge 142 may operate similar to that of cartridge 42, the description herein emphasizing cartridge 42 should be understood to also describe cartridge 142 and its operation, except where otherwise indicated.

Still other cartridge embodiments are contemplated within the context of the present disclosure. For example, an electrostatic anode might be used in conjunction with each cartridge to positively charge small particles in the exhaust stream to enhance the ease with which they can be trapped by the corresponding cartridge, and reduce the necessary thickness of filter medium. This strategy would have the added benefits of lighter weight, lower pressure drop across an associated exhaust particulate filter and lower power requirements. In other embodiments, a platinum coated substrate, such as the tube of the filter cartridge, or some other substrate, could be used to enable lowering of the necessary regeneration temperature and also assist in consuming unburned hydrocarbons and reducing carbon monoxide in the exhaust. Lower power requirements and lower pressure drop could also be available in such an embodiment.

Returning to FIGS. 3 and 4, each heating element 60 may further be disposed within a corresponding one of electrical circuits 98, and may be selectively energized via electronic control unit 96, to initiate regeneration of the corresponding cartridge 42. In one embodiment, a predetermined pattern might be followed for regenerating cartridges 42, for example, cycling through cartridges 42 one at a time, so that one of cartridges 42 is always being regenerated during operation of engine system 22. In other instances, groups of cartridges 42 might be regenerated together, for example the group consisting of the outermost cartridges of array 36 might be regenerated together, then groups of cartridges progressively inward of the outermost cartridges might be successively regenerated.

In still other instances, cartridges 42 may accumulate particulate matter non-uniformly, making non-uniform regeneration of cartridges 42 desirable. For example, cartridges nearer a center of array 36, inside of a line Q for example, might accumulate particulate matter more rapidly than those cartridges which are relatively closer to an outer periphery of array 36, outside of line Q. It may therefore be desirable to schedule regeneration of cartridges inside of line Q relatively more frequently. It may also be desirable to regenerate certain of cartridges 42 at a frequency or in a pattern which varies depending upon operating conditions of engine 23. For instance, when engine 23 is operating at a relatively high load, the exhaust mass flow through filter 25 will tend to be relatively high. In some instances, cartridges 42 closer to the center of filter 25 may be filtering a disproportionate amount of exhaust gases passing through filter 25 due to flow behavior of exhaust gases when engine 23 is at higher speeds and/or loads. Due to the relatively high exhaust mass flow, cartridges inside of line Q for example may be relatively more difficult to regenerate during higher load conditions as the exhaust gases may extinguish a flame, if one can even be generated. Thus, cartridges outside of line Q might be successfully regenerated at high load conditions, but cartridges inside of line Q only regenerated at lower load conditions. Signals from sensor 101 may be used to determine whether exhaust mass flow conditions for regenerating certain cartridges are appropriate at any given time. It will thus be appreciated that a variety of factors may bear on the particular timing and frequency of the selected regeneration pattern or strategy.

A further aspect of the present disclosure is a control strategy whereby the accumulation of particulate matter on/in individual cartridges 42 may be monitored or predicted and regeneration selectively scheduled and/or initiated as needed. This approach will enable use of electrical power to initiate regeneration of individual cartridges no more often than necessary, resulting in substantial energy savings over conventional systems which simply regenerate an entire filter regardless of whether individual units within the filter need it or not. To this end, regeneration system 90 may include at least one monitoring element as mentioned above, such as electronic control unit 96, which monitors an electrical resistance property of each one of electrical circuits 98. Monitoring the electrical resistance property may include monitoring an electrical resistance of an electrically conductive element of each of cartridges 42. In one embodiment, the monitored elements may be electrically powered heating elements 60, but in other embodiments the monitored element might be tube 50, filter medium 52, or some other component. Moreover, the term "electrical resistance property" should be understood to include such properties as electrical resistance, change in electrical resistance, rate of change in electrical resistance, etc.

Temperature is proportional to electrical resistance and, hence, electrical resistance of an electrically conductive medium of each of cartridges 42 may increase as the temperature increases. In one embodiment, the relationship between electrical resistance and temperature is used to monitor particulate loading during transients, for example, where engine system 22 increases speed and/or load to accommodate a temporary demand for increased power output. Under such conditions, the exhaust temperature from engine 23 will tend to increase. Since accumulation of particulate matter tends to inhibit exhaust gas flow, those cartridges 42 which heat up relatively faster during certain transients may be receiving a relatively larger percentage of exhaust flow, and hence may be less clogged with particulate matter than cartridges heating up relatively more slowly. Monitoring the electrical resistance property in circuits 98 during transients can thus allow the temperature and, hence, relative amount of accumulated particulate matter in individual cartridges 42 to be determined. The present disclosure further provides a means for determining which of electrically powered heating elements 60 may have failed, as the electrical resistance may be essentially infinite if the corresponding circuit 98 or its components become damaged.

Regardless of the specific strategy used for determining which of cartridges 42 needs to be regenerated, the present disclosure further provides for both feed forward and feedback control over regeneration via system 90. In one embodiment, electrical resistance of circuits 98 can be monitored to identify which of cartridges 42 are loading up with particulate matter relatively more rapidly. If certain cartridges 42 are determined to be loading more rapidly than others, regeneration system 90 can automatically adapt to proactively regenerate those cartridges 42 which are likely to need regeneration soonest. In a related aspect, apportioning of exhaust flow among cartridges 42 may be controlled by selectively regenerating certain cartridges by way of selectively energizing their corresponding elements 60. Thus, while exhaust gas distribution or supply to open ends or inlets 45 of cartridges 42 will not change, the actual filtering of exhaust gases may be varied among cartridges 42 by selective regeneration, as recently regenerated cartridges will be able to filter more of the exhaust gases than those cartridges which are relatively more clogged. Monitoring an electrical resistance property in circuits 98 can also allow regeneration system 90 to confirm that attempted regeneration of selected ones of cartridges 42 has been successful by monitoring the electrical resistance property subsequent to commanding regeneration. If electrical resistance increases, it may be concluded that the associated soot cake is burning and the regeneration has thus been initiated successfully.

While monitoring an electrical resistance property of electrical circuits 98 during transients is contemplated to be one practical implementation strategy, alternatives are contemplated. Cartridges which are relatively more clogged with particulate matter may have less exhaust gas passing through them than relatively less clogged cartridges. The relatively greater exhaust flow may cool certain of the cartridges more than those with less exhaust flow, resulting in some of the cartridges being at different temperatures than others and, hence, having differences in electrical resistance in their corresponding electrical circuits. Particulate matter also tends to be at least mildly conductive, and therefore its accumulation in or on a particular cartridge may also change the electrical resistance properties thereof. Accordingly, it should be appreciated that various relationships between particulate loading and electrical resistance properties other than those discussed above with regard to transients might be leveraged for use in selective regeneration of filter cartridges without departing from the full and fair scope of the present disclosure.

Figure 7:
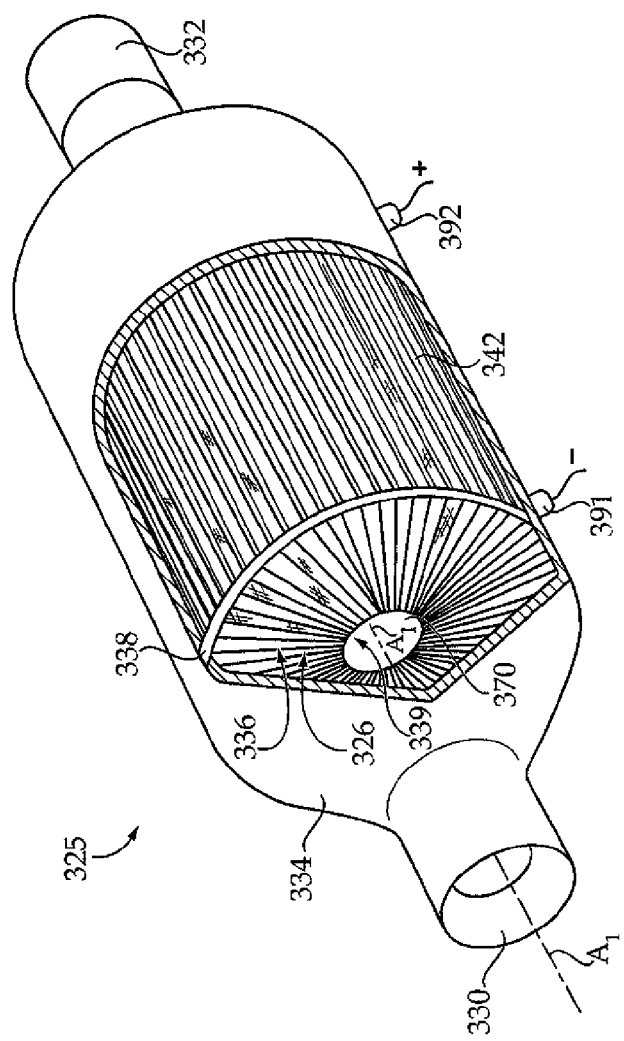
FIG. 7 is a cut-away view of an exhaust particulate filter according to one embodiment.

Referring to FIG. 7, there is shown an exhaust particulate filter 325 according to one embodiment. Filter 325 includes a shell 334 having an inlet portion 330 adapted to receive exhaust gases from an internal combustion engine or the like, and an outlet portion 332 for discharging exhaust gases treated via filter 325. A composite filtration unit 326 may be disposed within filter shell 334, and defines a longitudinal filter axis $A_1$. Composite filtration unit 326 may include an array 336 of filter elements 342 and a frame which includes a support ring 338, or another suitable support mechanism, supporting a plurality of filter elements 342. Filter elements 342 may be arranged about and radially spaced from longitudinal filter axis $A_1$. An inner support mechanism 339 may be provided and located inwardly of support ring 338 and filter elements 342. Filter 325 may define an exhaust gas flow path which includes an axial exhaust gas flow path between inlet portion 330 and outlet portion 332. An "axial" exhaust gas flow path will exist where exhaust gases flow through an exhaust particulate filter, such as filter 325, in a direction which is generally parallel a longitudinal axis of the subject filter. Thus, while exhaust flow through filter 325 will of course not be exclusively restricted to an axial direction, at least a majority of the time exhaust gases may be expected to be flowing between inlet portion 330 and outlet portion 332 in a direction generally parallel axis $A_1$. A closure 370 may be coupled with inner support mechanism 339, such that unfiltered exhaust gases impinging on closure 370 are briefly directed axially outward, and then flow between filter elements 342. Exhaust gases may then flow into each of filter elements 342, through filter elements 342, and are subsequently discharged through outlet portion 332. In a manner analogous to other embodiments described herein, shell 334 may define a single exhaust gas distribution pattern from inlet portion 330 to filter elements 342 and thenceforth to outlet portion 332. Filter elements 342 may be replaceable individual cartridges, similar to the foregoing embodiments, but might also each be a part of a one-piece filter structure positioned within shell 334.

Filter 325 may include an electrically regenerated exhaust particulate filter, and to that end includes a first electrical connector 391 and a second electrical connector 392. Electrical connectors 391 and 392 may be adapted to connect with a source of electrical power similar to that of other filter systems described herein, and may also connect with a plurality of electrically powered heating elements for selectively initiating regeneration of filter elements 342. Thus, each filter element 342 may be configured via energizing an electrically powered heating element coupled therewith for selective regeneration, as further described herein. Similar to other embodiments described herein, regeneration of filter elements 342 may occur one at a time, or in groups, and typically less than all of filter elements 342 will be regenerated at any one time. Monitoring a particulate accumulation state of individual ones of filter elements 342 may take place in a manner similar to that described above. In other embodiments, a different monitoring strategy, or no monitoring, might be used. It should further be appreciated that the basic system layout and components used to connect electrically powered components of filter 325 with an electrical power source and/or electronic control unit are generally analogous to those used in connection with other embodiments described herein, and are thus not described in detail.

Referring now to FIG. 9a, there is shown a filter element 342 suitable for use in filter 325 of FIG. 7. Filter element 342 may include a longitudinal filter element axis R, and may include a first axial end 345 and a second axial end 346. A filter medium 352 which includes a fibrous metallic material extends between first axial end 345 and second axial end 346. In one embodiment, filter element 342 may be formed of a fibrous metallic material, similar to the sintered mat of metal fibers described in connection with other embodiments herein. Filter element 342 may also include a plurality of panels of fibrous metallic material joined at then peripheral panel edges to adjacent panels of fibrous metallic material, for example by soldering, brazing, welding or via a suitable adhesive. In one embodiment, filter medium 352 may be a structural medium of which filter element 342 is made, and no additional framework or supporting structure need be used. Thus, filter element 342 may be formed wholly of fibrous metallic filter material, or another suitable filter material, apart from the electrically powered heating element(s) associated therewith, which are further described herein. Filter element 342 may include an upper side 362 and an opposite lower side 364. Filter element 342 may further include a first lateral side or side wall 366 and a second lateral side or side wall opposite side wall 364 which is not visible in the FIG. 9a illustration. In one embodiment, filter element 342 may include a plurality of planar porous filter walls, corresponding to upper side 362, lower side 364, lateral side 366 and the lateral side opposite lateral side 366, each of the planar porous filter wails being formed of filter medium 352. The plurality of planar porous filter walls may define a wedge shape such that each filter element 342 used in filter 325 includes a wedge shaped radial segment of composite filtration unit 326. Filter elements 342 may be spaced equally radially about axis $A_1$ in filter 325.

Figure 12:
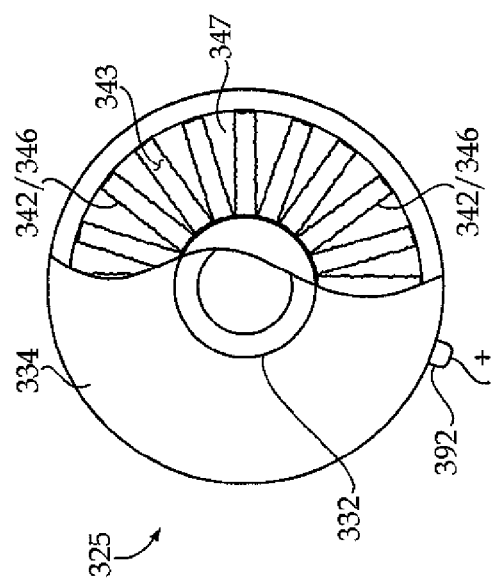
FIG. 12 is a cut-away end view of the exhaust particulate filter of FIG. 7.

The plurality of planar porous filter walls may further define an exhaust feed opening located, for example, at second axial end 346. Thus, in one embodiment, second axial end 346 may define an exhaust feed opening for passing exhaust gases out of filter element 342. Axial end 346 may include an open end defining a rectangular exhaust gas feed opening corresponding to the edges of the planar porous filter walls located at axial end 346. Referring also to FIG. 12, there is shown an end view of filter 325, illustrating exhaust feed openings 343 formed in second axial ends 346 of each of filter elements 342. A suitable sealing mechanism such as a support plate 347 for filter elements 342 may be positioned between each of filter elements 342 adjacent outlet portion 332 as shown. Support plate 347 may prevent reentry of filtered exhaust gases passed out of exhaust feed openings 343. In other embodiments, a different shape or location of an exhaust feed opening may be used. For example, an exhaust feed opening might be located in lower side 364. In such an embodiment, rather than feeding filtered exhaust gases out of an opening at axial end 346, filtered exhaust gases might be fed into a passage defined by structure 339 in filter 325, and thenceforth fed out through outlet portion 332. Exhaust gases might alternatively be fed into filter element 342 by way of an exhaust feed opening, then passed out through the planar porous filter walls. Thus the term "exhaust feed opening" may be understood to refer to an opening whereby unfiltered exhaust gases are led into filter element or an opening whereby filtered exhaust gases are fed out of filter element 342.

In one practical implementation strategy, exhaust gases are fed in filter 325 in a direction generally toward first axial end 342, and then flow by way of a divergent flow path to impinge upon first side wall 366 and the second side wall opposite side wall 366 which is not visible in FIG. 9a. A set of arrows G illustrate divergence of the example exhaust flow path at first axial end 345. Exhaust, gases carrying particulates may then pass into filter element 342, trapping suspended particulates in filter medium 352. Filtered exhaust gases pass out of the exhaust feed opening, shown as exhaust feed opening 343 in FIG. 12, via a flow path illustrated with arrow H in the example embodiment.

Filter medium 352 may include a particulate loading area 353. In the illustrated embodiment, particulate loading area 353 may include substantially an entire surface area of side wall 366, and also substantially an entire surface area of the opposite side wall. Depending upon the particular wedge configuration chosen for filter element(s) 342 or the configuration of filter 325 itself, nearly all of an external surface area of each filter element 342 may comprise the particulate loading area 353. Trapping of particulates via filter element 342 may result in the creation of a soot cake 370 on filter element 342, in a manner that will familiar to those skilled in the art. As particulates accumulate and soot cake 370 increases in thickness, density and/or size, filtering efficacy of filter element 342 will tend to decrease and regeneration or burning off of soot cake 370 may become desirable.

Filter element 342 may include an electrically powered heating element 360 which is positioned upon lateral side wail 366 and contacts filter medium 352. As alluded to above, electrically powered heating element 360 may include a resistive heating element similar to the electrically powered resistive heating elements previously described herein. Electrically powered heating element 360 may include a first electrical connector or electrical contact 376 at a first end thereof and a second electrical connector or electrical contact 378 at a second end thereof. A suitable wiring harness or the like (not shown) may be used to connect electrical connectors 376 and 378 with electrical connectors 391 and 392 when filter element 342 is assembled with other components of composite filtration unit 326 and positioned within shell 334. When filter 325 is connected with an electrical power source, similar to other embodiments described herein, electrically powered heating element 342 may be energized to selectively initiate regeneration of filter element 342.

Electrically powered heating element 360 may include a contact interface 354 with filter medium 352 within particulate loading area 353. The term "contact interface" refers to physical contact between electrically powered heating element 360 and filter medium 352. In FIG. 9a, a single electrically powered heating element 360 is shown, which is externally mounted on side wall 366. It should be appreciated that, multiple electrically powered hearing elements might be used, one to initiate regeneration on each of the respective side walls of filter element 342. The present description should be understood to refer genetically to embodiments where a single electrically powered heating element is used, as well as embodiments where two or more electrically powered heating elements are used. Further, rather than positioning electrically powered heating element 360 externally, element 360 might be positioned internally of filter element 342, or woven into filter medium 352 if desired.

Contact interface 354 may define a shape which includes a plurality of linear segments between electrical contact 376 and electrical contact 378. Each of the plurality of linear segments may be oriented at a right angle to adjacent segments, resulting in the squared configuration illustrated in FIG. 9a. The shape defined by contact interface 354 is exemplary only, as will be further apparent from the following description. In accordance with one aspect of the present disclosure, contact interface 354 may define a non-axial regeneration propagation profile for filter element 342. The non-axial regeneration propagation profile results at least in part from the shape of contact interface 354 and from a contact length of contact interface 354. The contact length of interface 354 may be defined by a length of contact between electrically powered heating element 360 and filter medium 352. The contact length may be at least as great as an axial length of filter element 342 between first axial end 345 and second axial end 346, and in certain embodiments the contact length may be greater than the axial length of filter element 342. As will be further apparent from the following description, by contacting electrically powered heating element 360 with filter medium 352 according to a certain geometry, the manner in which a regeneration flame will propagate subsequent to initiating burning of soot cake 370 can be tailored as desired.

Those skilled in the art will be familiar with regeneration propagation profiles which are axial, in contrast to the present disclosure. For example, designs are known where a regeneration flame propagates in a downstream axial direction, generally in a direction parallel a longitudinal axis of a filter element, and typically with the flow of exhaust gases. Designs are also known where a regeneration flame propagates in an upstream axial direction, parallel a longitudinal axis of a filter element, and typically against the flow of exhaust gases. Each of these strategies suffer from certain disadvantages. In the case of upstream axial propagation, a regeneration flame may be "blown out" by the flow of exhaust gases. Upstream axial propagation may also require excessive energy input from a heating element and/or the injection of fuel or other additives into the exhaust stream or the use of expensive precious metal catalysts. In the case of downstream axial propagation, a regeneration flame may be "fanned" by the flow of exhaust gases, and can in some cases burn out of control, melting or otherwise stressing components of the associated filter. Filters according to the present disclosure may avoid the problems associated with axial flame propagation. A non-axial regeneration propagation profile means that regeneration flame propagation will occur at least predominantly in a direction which is transverse to a longitudinal axis of a given filter element. Thus, when filter element 342 is regenerated, at least a majority of soot cake 370 will be burned by regeneration flame propagation in directions which are transverse to filter axis R, i.e. non-axial directions.

The non-axial regeneration propagation profile defined by contact interface 354 may further include a cross-flow regeneration propagation profile, where regeneration flame propagation will take place in a direction which is transverse to a direction of the average flow of exhaust gases. As alluded to above, exhaust gases will typically not flow through a filter or filter element in a single flow direction. Based on the configuration of filter 325 and filter element 342, however, exhaust gases flowing therethrough will have an average flow direction. "Average flow direction" may be understood as an average of a flow direction of each particle of exhaust gases and particulates within filter 325 at any one time. If a snapshot could be taken of all of the particles of exhaust gases and particulates flowing through filter 325 at any given instant, each of the particles would define a displacement vector having a vector direction. Averaged together, the vector directions would define an average exhaust flow direction. In filter 325, the average exhaust flow direction may be generally parallel axis $A_1$ as described herein. In filter element 432, the average exhaust flow direction may thus be generally parallel axis R. Accordingly, where contact interface 354 defines a cross-flow regeneration propagation profile, when filter element 342 is regenerated, at least a majority of soot cake 370 will be burned by regeneration flame propagation in directions which are transverse to the average exhaust flow direction. Cross-flow regeneration flame propagation tends to be more readily sustainable than regeneration flame propagation against a flow of exhaust gases, but also tends to be less aggressive than regeneration flame propagation with a flow of exhaust, gases.

In FIG. 9a, filter element 342 is shown at a regeneration state where electrically powered heating element 360 has been energized to initiate regeneration of soot cake 370. Once regeneration is initiated, electrically powered heating element 360 may be de-energized and propagation of flame front 374 may continue according to the non-axial regeneration propagation profile after de-energizing electrically powered heating element 360. A flame front 374 has begun to propagate away from electrically powered heating element 360 to leave behind a regenerated zone 372 which consists of substantially particulate-free areas of filter medium 352. Referring also to FIG. 9b, there is shown filter element 342 at a subsequent regeneration state. It may be noted that regenerated zone 372 has enlarged substantially relative to the state shown in FIG. 9a. Flame front 374 has further progressed outwardly of electrically powered heating element 360. From the state depicted in FIG. 9b, subsequent propagation of flame front 374 will take place almost entirely in non-axial directions relative to axis R. It may also be noted by comparing the regeneration state of filter element 342 in FIG. 9b with the regeneration state of filter element 342 in FIG. 9a that regeneration flame propagation is taking place predominantly in a cross-flow direction, as described herein. State another way, soot cake 370 will typically burn off predominantly by way of the advancement of flame front 374 in directions which are transverse to axis R and which are transverse to the average exhaust flow direction. Where electrically powered heating element 360 is the only heating element used with filter element 342, regeneration flame propagation may be expected to proceed from the state depicted in FIG. 9b about the rest of filter element 342 in a generally non-axial, cross flow manner. Where an additional electrically powered heating element is used, flame front 374 may advance generally non-axially about filter element 342 until flame front 374 meets and joins with another flame front from the other electrically powered heating element. In filter 325, filter elements 342 may be regenerated individually. Thus, initiation of regeneration of a first one of filter elements 342 may be followed by initiating regeneration of a second one of filter elements 342 subsequent to initiating regeneration of the first one of filter elements 342. This operating strategy is generally analogous to the strategy described above for regenerating filters using filter elements which are not wedge shaped.

Referring now to FIG. 10, there is shown a filter element 442 according to another embodiment. Filter element 442 may include a shape, materials and general construction similar to filter element 342. Filter element 442 may include a longitudinal axis S extending between a first axial end 445 and a second axial end 446. An electrically powered heating element 460 may extend from first axial end 445 to second axial end 446, and may include a first electrical connector or contact 476 and a second electrical connector or contact 478. Electrically powered heating element 460 may include a contact interface 454 with fibrous metallic material of filter element 442 which is approximately equal in length to a longitudinal filter element length of filter element 442 between first axial end 445 and second axial end 446. In the embodiment shown, contact interface 454 may include a linear contact interface meaning that, contact interface 454 defines a straight or substantially straight line extending from first axial end 445 to second axial end 446. Filter element 442 is shown at a regeneration state where a soot cake 470 is beginning to burn via a flame front 472 on each side of contact interface 454. A regenerated zone 472 is substantially free of trapped particulates and located between electrically powered heating element 460 and flame front 472. In the FIG. 10 embodiment, virtually zero axial flame front propagation will take place as flame front 472 advances about filter element 442.

Referring now to FIG. 11, there is shown a filter element 542 according to another embodiment. Like filter element 442, filter element 542 may include a shape, materials and general construction similar to filter element 342. Filter element 542 defines a longitudinal filter element axis T and includes a first axial end 545, and a second axial end 546. An electrically powered heating element 560 including a first electrical connector or contact 576 and a second electrical connector or contact 578 is positioned in contact with a fibrous metallic material of filter element 542 and has a contact interface 554 therewith. Contact interface 554 is a non-linear contact interface, and may include a sinusoidal configuration as shown. Filter element 542 is shown at a regeneration state where a flame front 574 is propagating outwardly from electrically powered heating element 560 and burning a soot cake 570. While some axial flame front propagation may occur during early stages of regeneration of filter element 542, as is the case with filter element 342, regeneration flame propagation will be predominantly in non-axial directions about filter element 542.

Figure 8:
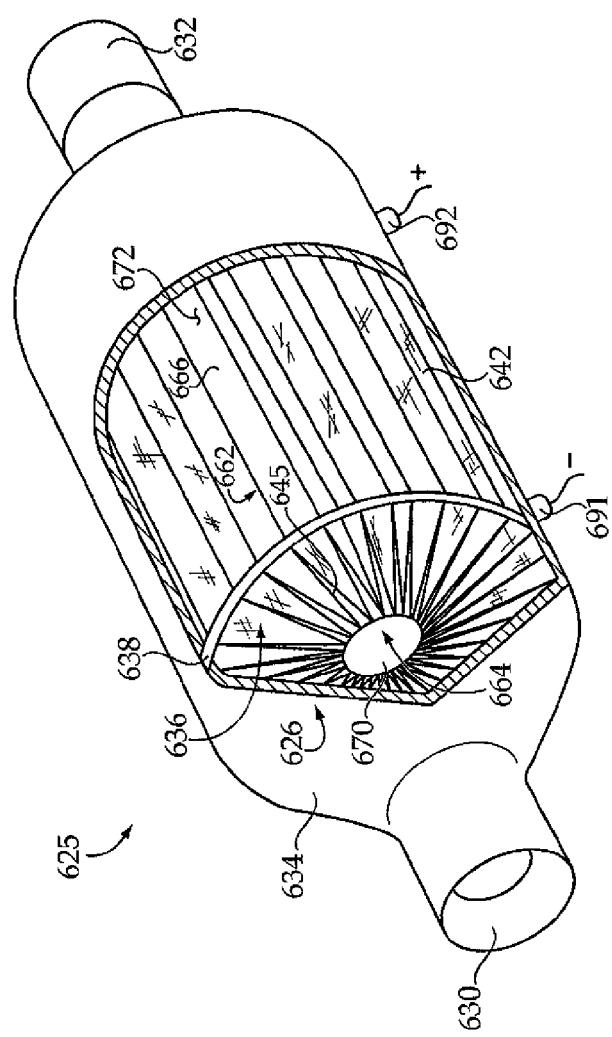
FIG. 8 is a cut-away view of an exhaust particulate filter according to another embodiment.

As described herein, each of filter elements 342, 442 and 542 may be used in filter 325. It will further be recalled that each of filter elements 342, 442 and 542 may have a wedge-shaped configuration. A variety of wedge shapes are known and used in exhaust particulate filters. Accordingly, it should be appreciated that the specific wedge shape used in filter 325 or other filters contemplated herein may differ from the wedge shape shown for each of filter elements 342, 442 and 542. Referring now to FIG. 8, there is shown a filter 625 which utilizes filter elements 642 having an alternative wedge shape. Filter 625 may include a shell 634 having an inlet portion 630 and an outlet portion 632 and a composite filtration unit 626 positioned within shell 634 which includes an array 636 of filter elements 642 supported via a frame 638. Each filter element 642 may include a first axial end 645 and a second axial end which is obscured by shell 634. Each filter element 642 may further include an upper side or upper edge 662, a lower side or lower edge 664 and a plurality of lateral sides 666 extending between upper side 662 and lower side 664 and between the corresponding axial ends. Filter elements 642 may include a narrowing taper from lower edge 664 toward upper edge 662. Each of filter elements 642 may further include an axial length dimension extending between then axial ends and a triangular cross-sectional shape corresponding to the illustrated triangular shape of first axial end 645. The second axial end, not visible in FIG. 8, may have a triangular shape identical with that of axial end 645. In filter 625, a first electrical connector 691 and a second electrical connector 692 may be used which electrically connect with electrically powered heating elements (not shown) coupled one with each of filter elements 642 in a manner analogous with that of filter 325. Each of filter elements 642 may be separated from adjacent filter elements via an interstice 672. Exhaust gases flowing from inlet portion 630 may flow into interstices 672 between adjacent filter elements 642 and thenceforth pass into interiors of each filter element 642. Particulates may be filtered from the exhaust gases as the exhaust gases pass from interstices 672 into filter elements 642. Cleaned exhaust gases may be passed out via outlet portion 632. An exhaust feed opening (not shown) may be located in the second axial end of each filter element to feed filtered exhaust gases to outlet portion 632. A closure 670 may be positioned radially inward of filter elements 642. Closure 670 may prevent entry of unfiltered exhaust gases into a portion of composite filter assembly 625 which is radially inward of filter elements 642, and serves to direct exhaust gases impinging thereon toward filter elements 642.

INDUSTRIAL APPLICABILITY

Figure 6:
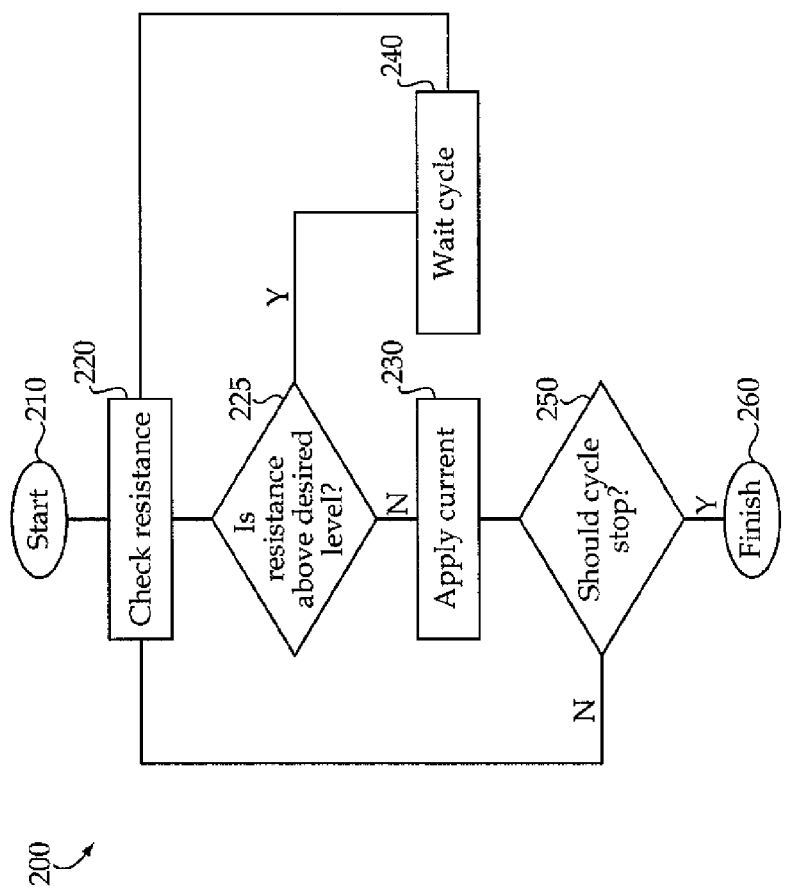
FIG. 6 is a flowchart illustrating a filter regeneration cycle, according to one embodiment.

Referring to FIG. 6, there is shown a flowchart 100 illustrating one example regeneration/control process according to the present disclosure. The process of flowchart 200 may begin at a START or initialize step 210. Initialization of electronic control unit 96, or another control unit of machine 10, may occur upon starting engine 23, for example. From step 210, the process may proceed to step 220 wherein electronic control unit 96 may check the electrical resistance in one of the electrical circuits 98 associated with one of cartridges 42. As discussed herein, an electrical resistance property other than resistance might be monitored with electronic control unit 96, such as change in electrical resistance, rate of change in electrical resistance, etc. Electrical current will typically be supplied to circuits 98 to enable measuring/monitoring the electrical resistance property. Hence, at step 220 one or more of electrical circuits 98 may be energized.

From step 220, the process may proceed to step 225 wherein electronic control unit 96 may determine whether electrical resistance is above a desired level. It will be recalled that during transients exhaust temperature may increase. Since resistance is typically directly proportional to temperature, if resistance is above a desired level at step 225, it may be concluded that a certain level of exhaust flow is passing through the subject cartridge and, hence, it is not clogged to a point at which regeneration is needed, if electrical resistance is not above a desired level at step 225, then the subject cartridge may need to be regenerated and the process may proceed to step 230 at which an electrical current is applied to initiate regeneration. If at step 230 resistance is above a desired level, the process may proceed to step 240 to implement a wait cycle for that particular cartridge, then loop back to step 225 to check resistance again. If the process proceeds via step 230, after applying current it may proceed to step 250 to query whether the cycle should stop, for example if engine 23 has been shut down, conditions are not otherwise appropriate for regeneration, or whether the process should proceed to check another cartridge. If yes, the process may proceed to step 260 to FINISH. If no, the process may return to step 220 to monitor the same or another one of cartridges 42.

All of the filter embodiments contemplated herein may include an array of filter cartridges 42 having a shape which can be at least partially matched to a shape of parts of a filter/filter housing wherein the respective array of cartridges is to be positioned. Rather than being restricted solely to cylindrical shapes as in many earlier filter design strategies, the present disclosure provides for vastly greater flexibility in filter shape design. This aspect is considered to greatly improve the ease with which exhaust particulate filters may be fitted within spatially restrictive or spatially complex spaces within or on machines. Further, the use of robust materials having similar or identical coefficients of thermal expansion can result in a filter capable of withstanding shocks and vibrations associated with rugged off-highway environments, as well as thermal cycling and relatively extreme temperatures. Moreover, no moving parts or delicate temperature controls are necessary, as cartridges 42 may be regenerated while exhaust gases are passing therethrough according to the single exhaust flow distribution pattern of filter 25.

As mentioned above, the presently described regeneration strategy also offers advantages with regard to power consumption and the ease with which a particular system can be retrofitted. The relatively low power consumption that initiates regeneration of one or a small number of cartridges 42 will permit regeneration during idling and refueling. And it will also be unnecessary to equip retrofitted machines, or new machines for that matter, with overly large and expensive alternators for powering regeneration system 90. The present strategy will also allow failures to be predicted before they actually occur. By monitoring a base resistance in electrical circuits 98 over time, preventative maintenance of filter 25 may be undertaken, replacing cartridges 42 which are predicted to fail due to damage to their heating element 60. Exhaust temperature feedback is also made possible by monitoring an electrical resistance in circuits 98.

Noise concerns may also be lessened, as combustion noise from regenerating a smaller proportion of the total number of filter cartridges may be relatively low. Expense is also reduced, as noble metal catalysts and relatively complex dosing systems may be reduced or eliminated altogether. By relying at least primarily on electrical regeneration, the present strategy is also not susceptible to variations due to fuel composition such as sulfur content, as is the case with certain other designs. Where catalysts are used, electronic control unit 96 may also be able to determine the amount of supplemental heat which needs to be added for fast CO and unburned hydrocarbon light-off.

Further still, filters according to the present disclosure may have a relatively longer working life, as the thermal cycling resulting horn regeneration of only a few of cartridges 42 at a time will typically be much less than that of other filters wherein all or a relatively larger proportion of filter cartridges are regenerated together. Finally, concerns relating to cracking, melting and other heat-related damage may be reduced in filters designed and operated as described herein compared with other known systems. Many earlier filter systems were designed with relatively complex diffusers and the like in an attempt to ensure that the filter would load up with particulate matter relatively uniformly. Non-uniform loading tended to be of significant concern, as regeneration of relatively heavily loaded portions of a filter could result in relatively extreme temperature gradients across the filter, leading to heat-related damage.

The present disclosure reduces these concerns, as not only can relatively minute portions of the filter, e.g. one cartridge at a time, be selectively regenerated, but portions of the filter which are loading up relatively more rapidly than others can be proactively regenerated prior to a point at which the volume of particulate matter becomes a concern. The feed forward evaluation of the loading state of cartridges 42 also enables regeneration system 90 to adapt and react to loading of cartridges 42, proactively regenerating certain cartridges at a certain time or under certain conditions so that other cartridges can be regenerated at other times or under other conditions. For example, as discussed above, it may not be desirable to regenerate cartridges within a main flow path during high loads. Thus, during high loads, cartridges which are not within the main flow path may be regenerated to make them available for filtering exhaust gases during lower loads, during which those in the main flow path may be regenerated. While the foregoing control strategy emphasizes monitoring and control of an embodiment employing cartridges 42, it should be appreciated that the control strategy is similarly applicable to other embodiments contemplated herein.

The present description is for illustrative purposes only, and should not be construed to narrow the breadth of the present disclosure in any way. Thus, those skilled in the art will appreciate that various modifications might be made to the presently disclosed embodiments without departing from the intended spirit and scope of the present disclosure. Other aspects, features and advantages will be apparent upon an examination of the attached drawings and appended claims.

What is claimed is:

1. A method of operating an exhaust particulate filter system for an internal combustion engine comprising the steps of:

feeding exhaust gases from an exhaust gas inlet of an exhaust particulate filter shell into a composite filtration unit positioned within the exhaust particulate filter shell, the composite filtration unit defining a longitudinal filter axis and having a plurality of filter elements which each include a fibrous metallic material having a particulate loading area;

initiating regeneration of one of the filter elements via energizing an electrically powered heating element having a contact interface with the fibrous metallic material within the corresponding particulate loading area which defines a non-axial regeneration propagation profile, and such that heat is conducted from the energized heating element to particulate matter contacting the energized heating element within the particulate loading area; and propagating a regeneration flame about the one of the filter elements according to the non-axial regeneration propagation profile.

2. The method of claim 1 further including a step of de-energizing the electrically powered heating element, wherein the non-axial regeneration propagation profile includes a cross-flow regeneration propagation profile, and wherein the step of propagating includes propagating a regeneration flame according to the cross-flow regeneration propagation profile after de-energizing the electrically powered heating element.

3. The method of claim 2 wherein each of the filter elements includes a wedge shaped segment of the composite filtration unit, wherein the step of initiating regeneration includes initiating regeneration of a first one of the wedge shaped segments, the method further including a step of initiating regeneration of a second one of the wedge shaped segments subsequent to initiating regeneration of the first one of the wedge shaped segments.

4. The method of claim 2 further including the steps of trapping particulates in the exhaust gases via the filter elements prior to the step of initiating regeneration, and receiving sensor inputs indicative of a plurality of different particulate accumulation states for a plurality of different ones of the filter elements, wherein the step of initiating includes initiating regeneration in a manner responsive to the sensor inputs.

5. The method of claim 4 wherein the step of receiving sensor inputs includes receiving sensor inputs indicative of an electrical resistance property of the electrically powered heating element associated with each one of the filter elements of the plurality of filter elements.

6. The method of claim 2 wherein the step of feeding exhaust gases includes feeding exhaust gases according to an exhaust gas distribution pattern defined by the exhaust particulate filter shell and the composite filtration unit, prior to the step of initiating regeneration, and wherein the step of initiating regeneration includes initiating regeneration without changing the exhaust gas distribution pattern.

7. A method of regenerating an exhaust particulate filter including a composite filtration unit having a longitudinal filter axis and a plurality of filter elements each having a fibrous metallic material, the method comprising the steps of:
energizing at least one of a plurality of electrically powered heating elements associated one with each of the filter elements and having a contact interface with the corresponding fibrous metallic material within a particulate loading area thereof;
conducting heat from the energized heating element to particulate matter contacting the energized heating element within the particulate loading area; and
regenerating at least one of the filter elements according to a non-axial regeneration propagation profile defined by the corresponding contact interface via the step of energizing.

8. The method of claim 7 wherein each of the filter elements includes a wedge shaped segment of the composite filtration unit, and wherein the step of regenerating includes regenerating at least one of the wedge shaped segments.

9. The method of claim 8 wherein each of the filter elements includes a first axial end, a second axial end and a longitudinal filter element length extending from the first axial end to the second axial end, and wherein the step of energizing further includes energizing an electrically powered resistive heating element having a contact interface with the corresponding fibrous metallic material which includes a heating element contact length equal to at least a majority of the longitudinal filter element length.

10. The method of claim 9 wherein the step of energizing includes energizing an electrically powered resistive heating element having a linear contact interface with the corresponding fibrous metallic material.

11. The method of claim 9 wherein the step of energizing includes energizing an electrically powered resistive heating element having a sinusoidal contact interface with the corresponding fibrous metallic material.

12. The method of claim 9 wherein the step of regenerating further includes a step of initiating regeneration simultaneously at a plurality of regeneration initiation points spaced equally along the contact length of the electrically powered resistive heating element.

13. The method of claim 12 further comprising a step of feeding exhaust gases in an average exhaust flow direction through each of the filter elements, wherein the contact interface of each one of the electrically powered heating elements defines a cross-flow regeneration propagation profile and wherein the step of regenerating includes a step of propagating a regeneration flame in a cross-flow regeneration propagation direction which is transverse to the average exhaust flow direction for the corresponding filter element.

14. An exhaust particulate filter comprising:
a composite filtration unit defining a longitudinal filter axis and including a frame and a plurality of filter elements coupled with the frame which are arranged about and radially spaced from the longitudinal filter axis, each of the filter elements having a first axial end, a second axial end and a fibrous metallic material extending between the first axial end and the second axial end, the fibrous metallic material including a particulate loading area; and
a plurality of electrically powered heating elements each of which contact the fibrous metallic material of one of the filter elements via a contact interface within the particulate loading area, the contact interface defining a non-axial regeneration propagation profile for a corresponding one of the filter elements, and wherein each of the filter elements is configured via energizing a corresponding one of the electrically powered heating elements for selective regeneration according to the non-axial regeneration propagation profile at least in part by conducting heat from the energized heating element to particulate matter contacting the energized heating element within the particulate loading area.

15. The exhaust particulate filter of claim 14 wherein each of the filter elements includes a wedge shaped segment of the composite filtration unit having a plurality of planar porous filter walls together including the particulate loading area and defining an exhaust feed opening of the corresponding filter element.

16. The exhaust particulate filter of claim 15 wherein each of the filter elements defines an average exhaust flow direction, and wherein the non-axial regeneration propagation profile of each one of the electrically powered heating elements defines a cross-flow regeneration propagation profile which includes an average regeneration propagation direction which is oriented transverse to the average exhaust flow direction.

17. The exhaust particulate filter of claim 16 wherein each of the filter elements includes a longitudinal filter element length extending from the corresponding first axial end to the corresponding second axial end, and wherein the contact interface of each one of the electrically powered heating elements includes a contact length with the corresponding fibrous metallic material which is equal to at least a majority of the corresponding longitudinal filter element length.

18. The exhaust particulate filter of claim 17 wherein the contact interface of each one of the electrically powered heating elements includes a linear contact interface.

19. The exhaust particulate filter of claim 17 wherein the contact interface of each one of the electrically powered heating elements includes a non-linear contact interface.

20. The exhaust particulate filter of claim 14 wherein:
   each of the filter elements includes a plurality of planar porous filter walls defining a wedge shape, the plurality of planar porous filter walls further defining an exhaust feed opening and each having a first peripheral edge common with and joined to a second peripheral edge of another of the planar porous filter walls at a location opposite the corresponding exhaust feed opening; and
   the exhaust particulate filter further including an exhaust particulate filter shell wherein the composite filtration unit is disposed, the exhaust particulate filter shell having an exhaust gas inlet and an exhaust gas outlet and defining an exhaust gas distribution pattern from the exhaust gas inlet to the filter elements of the composite filtration unit.

\* \* \* \* \*